(12) United States Patent
Akie et al.

(10) Patent No.: US 7,848,495 B2
(45) Date of Patent: Dec. 7, 2010

(54) VOICE COMMUNICATION APPARATUS

(75) Inventors: Kazuyoshi Akie, Saitama (JP); Masashi Takada, Kanagawa (JP); Hiromi Aoyagi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1348 days.

(21) Appl. No.: 11/239,383

(22) Filed: Sep. 30, 2005

(65) Prior Publication Data

US 2006/0029086 A1    Feb. 9, 2006

(30) Foreign Application Priority Data

Apr. 3, 2003   (JP) ............... 2003-99942

(51) Int. Cl.
*H04M 11/00*   (2006.01)
*H04L 12/66*   (2006.01)

(52) U.S. Cl. ............... 379/93.07; 379/90.01; 379/93.04

(58) Field of Classification Search ............. 379/93.07, 379/90.01, 93.01, 93.04–93.06, 100.12, 212.01, 379/220.01; 370/401, 352
See application file for complete search history.

(56) References Cited

U.S. PATENT DOCUMENTS

| | | |
|---|---|---|
| 5,999,612 A | 12/1999 | Dunn et al. |
| 6,973,334 B2 * | 12/2005 | Katagishi et al. ............ 455/571 |
| 2001/0008556 A1 | 7/2001 | Bauer |
| 2006/0023700 A1 | 2/2006 | Usuba |

FOREIGN PATENT DOCUMENTS

| | | |
|---|---|---|
| GB | 2407449 A | 4/2005 |
| WO | WO 02/058351 A1 | 7/2002 |
| WO | WO 2004/059961 | 7/2004 |
| WO | WO 2004-091181 | 10/2004 |
| WO | WO 2004/102941 | 11/2004 |

\* cited by examiner

*Primary Examiner*—Melur Ramakrishnaiah
(74) *Attorney, Agent, or Firm*—Venable LLP; Michael A. Satori; Todd R. Farnsworth

(57) ABSTRACT

A voice communication apparatus is interposed between a telephone set and a public switched telephone network (PSTN) or a broadband network which can provide a frequency bandwidth broader than a frequency bandwidth of the public switched telephone network. The apparatus selects one of the PSTN and the broadband network, from which a voice signal is input. The apparatus takes account of the selected network, frequency characteristics of the selected network and of the telephone set, and appropriately adjusts frequency characteristics of a voice signal transmitted between the telephone set and the selected network by means of transmitter and receiver band-pass filter units. As a result, both the telephone set and the counterpart communication terminal can receive a voice signal of better transmission quality.

16 Claims, 12 Drawing Sheets

*Fig. 4*

| NETWORK/<br>CHARACTERISTICS | SWITCHES | | | |
| --- | --- | --- | --- | --- |
| | 20A | 20B | 20C | 20D |
| PSTN/NARROWBAND | 2 | 2 | 2 | 2 |
| IP/BROADBAND | 1 | 1 | 1 | 1 |
| IP/NARROWBAND | 1 | 1 | 2 | 2 |

Fig. 6

| NETWORK/ CHARACTERISTICS | TEL. SET TYPE | SWITCHES | | | | FILTER |
|---|---|---|---|---|---|---|
| | | 30A | 30B | 30C | 30D | 305 |
| PSTN/NARROWBAND | BROADBAND | 2 | 2 | 2 | 2 | Fig. 2A |
| PSTN/NARROWBAND | NARROWBAND | 2 | 2 | 1 | 1 | – |
| IP/BROADBAND | BROADBAND | 1 | 1 | 1 | 1 | – |
| IP/BROADBAND | NARROWBAND | 1 | 1 | 2 | 2 | Fig. 2B |
| IP/NARROWBAND | BROADBAND | 1 | 1 | 2 | 2 | Fig. 2A |
| IP/NARROWBAND | NARROWBAND | 1 | 1 | 1 | 1 | – |

Fig. 8

| NETWORK/ CHARACTERISTICS | TEL. SET TYPE | SWITCHES |||||| FILTER ||
| --- | --- | --- | --- | --- | --- | --- | --- | --- | --- |
| | | 40A | 40B | 40C | 40D | 40E | 40F | 305 | 408 |
| PSTN/NARROWBAND | BROADBAND | 2 | 2 | 2 | 2 | 1 | 1 | Fig. 2A | — |
| PSTN/NARROWBAND | NARROWBAND | 2 | 2 | 1 | 2 | 1 | 1 | — | — |
| IP/BROADBAND | BROADBAND | 1 | 1 | 1 | 1 | 1 | 1 | — | — |
| IP/BROADBAND | NARROWBAND | 1 | 1 | 2 | 2 | 2 | 2 | Fig. 2B | Fig. 2B |
| IP/NARROWBAND | BROADBAND | 1 | 1 | 2 | 2 | 1 | 1 | Fig. 2A | — |
| IP/NARROWBAND | NARROWBAND | 1 | 1 | 1 | 1 | 1 | 1 | — | — |

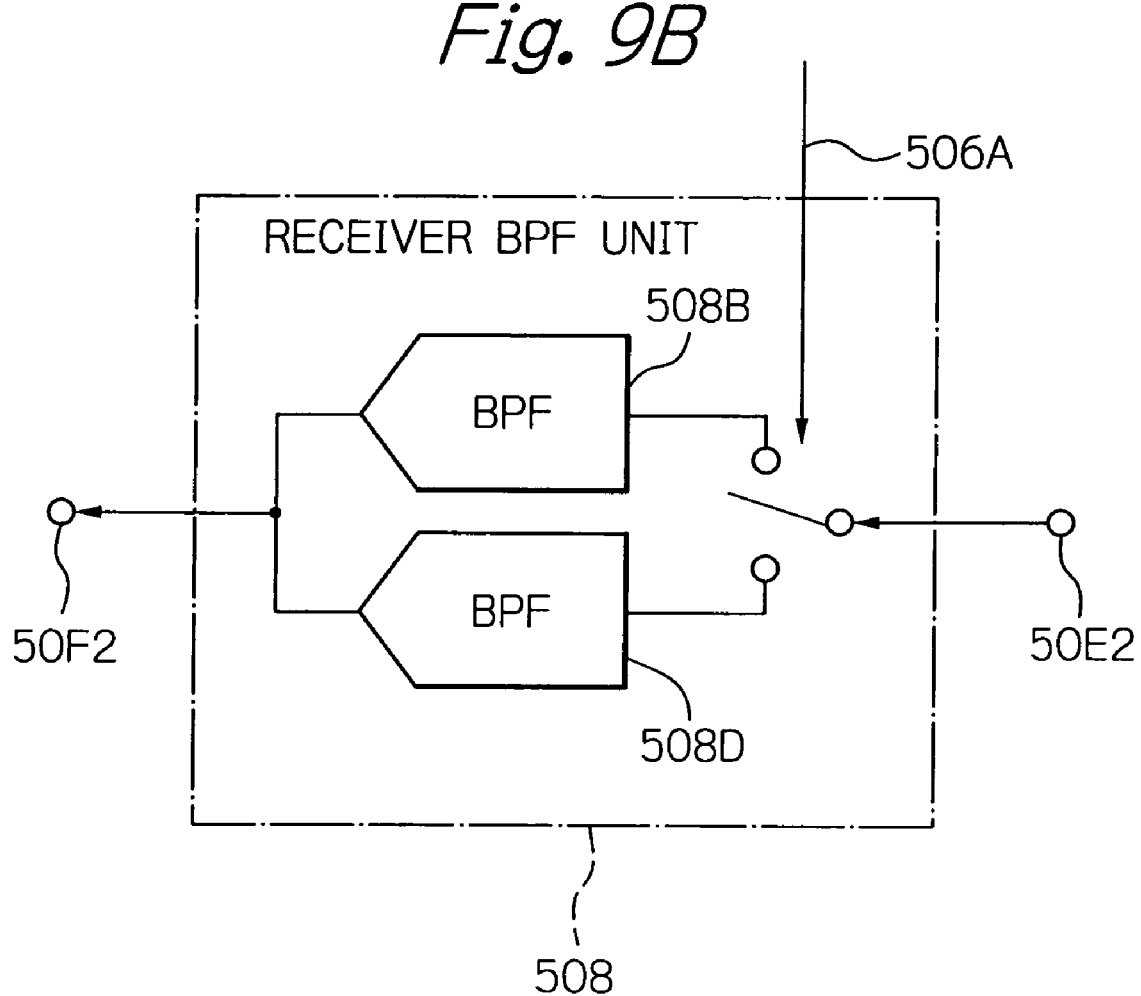

*Fig. 10*

| NETWORK/CHARACTERISTICS | TEL. SET TYPE | SWITCHES | | | | | | FILTER | |
|---|---|---|---|---|---|---|---|---|---|
| | | 50A | 50B | 50C | 50D | 50E | 50F | 305 | 508 |
| PSTN/NARROWBAND | BROADBAND | 2 | 2 | 2 | 2 | 2 | 2 | Fig. 2A | Fig. 2D |
| PSTN/NARROWBAND | NARROWBAND | 2 | 2 | 1 | 1 | 1 | 1 | — | — |
| IP/BROADBAND | BROADBAND | 1 | 1 | 1 | 1 | 1 | 1 | — | — |
| IP/BROADBAND | NARROWBAND | 1 | 1 | 2 | 2 | 2 | 2 | Fig. 2B | Fig. 2B |
| IP/NARROWBAND | BROADBAND | 1 | 1 | 2 | 2 | 2 | 2 | Fig. 2A | Fig. 2D |
| IP/NARROWBAND | NARROWBAND | 1 | 1 | 1 | 1 | 1 | 1 | — | — |

VOICE COMMUNICATION APPARATUS

BACKGROUND OF THE INVENTION

1. Field of the Invention

The present invention relates to an apparatus for voice communications, more specifically, to such an apparatus including or included in a telephone set.

2. Description of the Background Art

Today, voice communications over an IP (Internet Protocol) network such as the Internet are widespread. An IP network does not have such a limitation that a voice signal having its bandwidth of 4 kHz or more cannot be transmitted therein as with the public switched telephone network (PSTN) An IP network therefore enables voice communications including a broadband voice signal having the bandwidth of 4 kHz or more. Thus, high-quality voice communications with broadband voice signals could be achieved by voice communications over an IP network.

Voice communication system scan generally be classified into various voice communication systems over an IP network and other ones over an existing PSTN. Those systems are connected to one another to be a combined voice communication system.

High-quality voice communications require a telephone subscriber or terminal set adapted to a voice communication system employed. However, when communicating with somebody else on a communication network with a combined voice communication system as described above, the quality of voice communications may be deteriorated due to different voice communication systems included in the combined system.

For example, an existing ordinary telephone set, not adapted to an IP network communication, has transmitter frequency characteristics that a voice signal picked up by the microphone of the telephone set is band-limited to 4 kHz or less e.g. by a narrow band-pass filter. The telephone set also has receiver frequency characteristics that a voice signal input from the network is band-limited to 4 kHz or less e.g. by a narrow band-pass filter and then emitted from an earphone on loudspeaker. Accordingly, even though the network such as an IP network could transmit a voice signal of broader bandwidth not less than 4 kHz, the quality of voice communications to be achieved would only be the same as that of the PSTN.

Besides, if IP phones adapted to an IP network communication were used but the network between the IP phones were the PSTN or an IP network transmitting only a narrowband voice signal, a broadband voice signal (of bandwidth not less than 4 kHz) picked up by the microphone of the IP phone should not be input to the above-mentioned band-limited network, because the quality of voice communications might be deteriorated even if inputting such a broadband voice signal to the network.

For this reason, there is an increasing demand for an apparatus for voice communications that would achieve high-quality voice communications even in a combined system including different telephone sets and different networks, by taking account of different frequency bandwidths of voice signals to be transmitted between such telephone sets and networks.

It is an object of the present invention to provide a voice communication apparatus for high-quality voice communications even in the condition that voice signals of different frequency bandwidths are transmitted between different telephone sets and different networks.

SUMMARY OF THE INVENTION

In order to achieve the above object, the voice communication apparatus according to the present invention, interposed between a telephone set and a public switched telephone network (PSTN) or a broadband network which can provide a frequency bandwidth broader than a frequency bandwidth of the public switched telephone network, comprises PSTN communication circuitry for transferring a voice signal between the telephone set and the public switched telephone network, broadband communication circuitry for transferring a voice signal between the telephone set and the broadband network, and a communication switching unit for connecting the telephone set via the PSTN communication circuitry to the public switched telephone network when a voice signal is input from the public switched telephone network, and for connecting the telephone set via the broadband communication circuitry to the broadband network when a voice signal is input from the broadband network.

In order to achieve the above object, the voice communication apparatus according to the present invention, interposed between a telephone set and a public switched telephone network (PSTN) or a broadband network which can provide a frequency bandwidth broader than a frequency bandwidth of the public switched telephone network, comprises PSTN communication circuitry for transferring a voice signal between the telephone set and the public switched telephone network, broadband communication circuitry for transferring a voice signal between the telephone set and the broadband network, a network selection unit for selecting the public switched telephone network or the broadband network, from which a voice signal is input, a codec decision unit for measuring a frequency bandwidth provided by the broadband network to decide whether frequency characteristics of the broadband network are broadband or narrowband, and a comprehensive decision unit for taking account of the selected network and the frequency characteristics of the broadband network obtained respectively from the network selection unit and the codec decision unit, and connecting the telephone set either via the PSTN communication circuitry to the public switched telephone network or via the broadband communication circuitry to the broadband network.

In accordance with the voice communication apparatus of the present invention, high-quality voice communications are provided even in a network including both the PSTN and a broadband network.

BRIEF DESCRIPTION OF THE DRAWINGS

The objects and features of the present invention will become more apparent from consideration of the following detailed description taken in conjunction with the accompanying drawings in which:

FIG. 4 illustrates a switch operation table for a comprehensive decision unit shown in FIG. 2;

FIG. 6 illustrates a switch operation and filter switching table respectively for a comprehensive decision unit and a band-pass filter unit shown in FIG. 5A;

FIG. 8 illustrates a switch operation and filter switching table respectively for a comprehensive decision unit and an output/receiver band-pass filter unit shown in FIG. 7;

FIG. 9B is a schematic block diagram of the receiver band-pass filter unit illustrated in FIG. 9A;

FIG. 10 illustrates a switch operation and filter switching table respectively for a comprehensive decision unit and an output/receiver band-pass filter unit shown in FIG. 9A.

DESCRIPTION OF THE PREFERRED EMBODIMENTS

(A) First Embodiment

Figure 1:
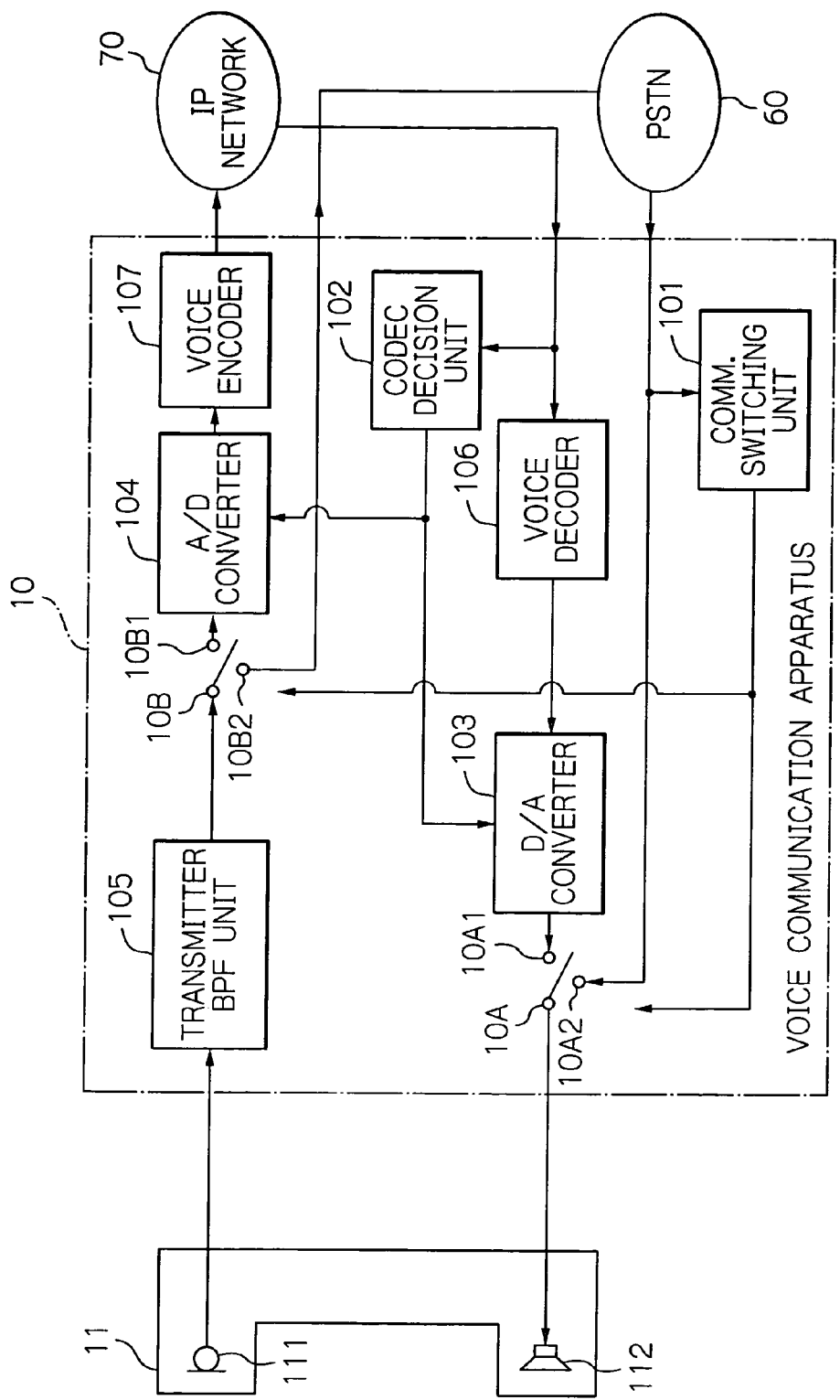
FIG. 1 is a schematic block diagram showing a first embodiment of a voice communication apparatus according to the present invention.

Referring to the drawings, a first embodiment of voice communication apparatus of the present invention will be described in detail.

(A-1) Structure of the First Embodiment

FIG. 1 is a schematic block diagram showing the first embodiment of voice communication apparatus according to the present invention.

A voice communication apparatus 10 of FIG. 1 can be connected to the public switched telephone network (PSTN) 60 transmitting a narrowband voice signal being band-limited to 4 kHz or less, and to an IP network 70 transmitting not only a narrowband voice signal but also a broadband voice signal with bandwidth of 4 kHz or more. The apparatus 10 processes a voice signal input from the communication network, PSTN 60 or IP network 70, in accordance with the communication system of the network for making voice communications with somebody else on the network.

Although the voice communication apparatus 10 of FIG. 1 is illustrated as if it were connected only to one telephone set 11, a plurality of telephone sets may, of course, be connected to the apparatus 10. The words "voice communications" are in this context directed to not only a normal voice signal but also other types of signal such as a facsimile signal.

As shown in FIG. 1, the voice communication apparatus 10 includes a communication switching unit 101, a codec decision unit 102, a digital-to-analog (D/A) converter 103, an analog-to-digital (A/D) converter 104, a transmitter band-pass filter unit 105, a voice decoder 106, a voice encoder 107, and switches 10A and 10B interconnected as illustrated.

In this context, the constituent elements arranged on a loop formed by the PSTN 60 and the telephone set 11 are classified into PSTN communication circuitry. The PSTN communication circuitry includes the switch 10A, an earphone 112 and a microphone 111 of the telephone set 11, the transmitter band-pass filter unit 105 and the switch 10B, accordingly. The elements arranged on another loop formed by the IP network 70 and the telephone set 11 are classified into broadband communication circuitry. The broadband communication circuitry includes the voice decoder 106, the D/A converter 103, the switch 10A, the earphone 112 and the microphone 111 of the telephone set 11, the transmitter band-pass filter unit 105, the switch 10B, the A/D converter 104 and the voice encoder 107, accordingly.

The PSTN communication circuitry is adapted to transfer a voice signal between the telephone set 11 and the PSTN 60. The broadband communication circuitry is adapted to transfer a voice signal between the telephone set 11 and the IP network 70.

The communication switching unit 101 is adapted to detect a voice signal from the PSTN 60, and operate the switches 10A and 10B depending on a detection result.

The switch 10A is adapted for passing a voice signal either from the PSTN 60 or from the IP network 70 to the earphone 112 of the telephone set 11, in accordance with a command from the communication switching unit 101. When the unit 101 does not detect a voice signal from the PSTN 60, the switch 10A is operated to select its terminal 10A1 to connect the earphone 112 to the D/A converter 103 for digital-to-analog conversion of the voice signal from the IP network 70. Then the D/A-converted voice signal is transmitted to the earphone 112. When the unit 101 detects the voice signal from the PSTN 60, the switch 10A is operated to select its terminal 10A2 to connect the earphone 112 directly to the PSTN 60. Then the voice signal input from the PSTN 60 is transmitted directly to the earphone 112.

The other switch 10B is adapted for passing a voice signal transmitted from the telephone set 11 and filtered by the transmitter band-pass filter unit 105 either to the PSTN 60 or to the IP network 70, in accordance with a command from the communication switching unit 101. When the switch 10A selects its terminal 10A1, the switch 10B is operated to select its terminal 10B1 to transmit the analog voice signal picked up by the microphone 111 and filtered by the filter unit 105 to the A/D converter 104. Then the voice signal A/D-converted by the A/D converter 104 is transmitted to the IP network 70. When the switch 10A selects its terminal 10A2, the switch 10B is operated to select its terminal 10B2 to transmit the analog voice signal picked up by the microphone 111 and filtered by the filter unit 105 directly to the PSTN 60.

The communication switching unit 101 is adapted to operate the switches 10A and 10B to respectively select the terminals 10A2 and 10B2 when the voice signal from the PSTN 60 is detected, or to respectively select the terminals 10A1 and 10B1 when the voice signal from the PSTN 60 is not detected. In this way, the communication switching unit 101 connects the telephone set 11 via the PSTN communication circuitry to the PSTN 60, or connects the telephone set 11 via the broadband communication circuitry to the IP network 70.

The codec decision unit 102 is adapted to decide a codec type (encoding scheme) available from an encoded voice signal input from the IP network 70. The codec decision unit 102 informs both the D/A converter 103 and the A/D converter 104 of the codec type. Based on the type of codec, the codec decision unit 102 is also adapted to measure a frequency bandwidth provided by the IP network 70 to decide whether frequency characteristics of the IP network are of a broadband or narrowband.

To the codec decision unit 102, any kind of method is applicable to obtain information on the codec type used in the voice communications, as far as the method can obtain the information from a voice signal input from the IP network 70. For example, there is a method to obtain the codec type information from the results of negotiation with the counterpart communication terminal such as another telephone set when starting the communication. There is another method to obtain the codec type information from the RTP header of an IP packet (voice signal) received from the IP network 70.

When the obtained codec type shows a codec of 8 kHz sampling, for example G.711 or G.729a codec, the codec decision unit 102 gives a decision that the IP network 70 has narrowband characteristics with the limited bandwidth of 4 kHz or less. On the other hand, when the obtained codec type indicates a codec of 16 kHz sampling, for example G.722 codec (codec of the sampling frequency higher than 8 kHz), the codec decision unit 102 gives a decision that the IP network 70 has broadband characteristics with the bandwidth of 4 kHz or more.

The voice decoder 106 is adapted to disassemble an IP packet input from the IP network 70 to restore a digital voice signal. The decoder 106 then gives the restored digital voice signal to the D/A converter 103.

The D/A converter 103 is adapted to convert, in accordance with the decision from the codec decision unit 102, the digital voice signal from the voice decoder 106 into a corresponding analog voice signal. The D/A converter 103 then gives the converted analog voice signal via the switch 10A to the earphone 112 of the telephone set 11.

The D/A converter 103 may include, for example, two digital-to-analog conversion units respectively of 8 kHz and 16 kHz sampling frequencies and select one of the units in accordance with the decision of the codec decision unit 102. Alternatively, the D/A converter 103 maybe operated with either an 8 kHz or 16 kHz sampling frequency and include a controller, not shown in the figures, for selecting one of the sampling frequencies in accordance with the decision of the codec decision unit 102. Anyway, the D/A converter 103 may have any kind of structure that enables desired digital-to-analog conversion.

When the codec decision unit 102 gives the decision that the IP network 70 has narrowband characteristics, the D/A converter 103 executes digital-to-analog conversion with a sampling frequency of 8 kHz. When the codec decision unit 102 gives the decision that the IP network 70 has broadband characteristics of G.722 codec, the D/A converter 103 executes digital-to-analog conversion with a sampling frequency of 16 kHz. In this embodiment, the IP network 70 has a G.722 codec of sampling frequency of 16 kHz, but the IP network 70 may be of any other type of codec which is able to D/A-convert a digital voice signal from the IP network 70 with the sampling frequency appropriate for the type of codec being used.

The transmitter band-pass filter unit 105 includes a band-limiting filter, not shown, which band-limits the analog voice signal from the microphone 111 of the telephone set 11 to output.

Figure 2A:
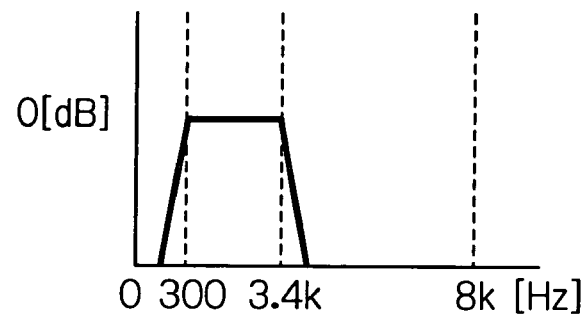
FIGS. 2A-2D plot the frequency characteristics of voice signals adjusted by a first-type through a fourth-type of filter in the voice communication apparatus according to the present invention, respectively.

An existing band-limiting filter used for ordinary telephone sets can be applied to the band-limiting filter in the transmitter band-pass filter unit 105. FIG. 2A shows the frequency characteristics of the band-limiting filter. As a result of filtering with this filter, a voice signal is attenuated at low frequency components thereof not higher than 300 Hz and at high frequency components thereof not lower than 3.4 kHz and the thus attenuated voice signal is output. However, the bandwidth described above may not be limited to the specific frequencies thus exemplified.

In this way, the transmitter band-pass filter unit 105 band-limits the analog voice signal in order to output the narrowband voice signal. It is therefore possible to prevent a broadband voice signal from being output to the network transmitting only narrowband voice signals.

The A/D converter 104 is adapted to convert, in accordance with the decision from the codec decision unit 102, the analog voice signal from the filter unit 105 into a corresponding digital voice signal. The A/D converter 104 then gives the converted digital voice signal to the voice encoder 107. The A/D converter 104 may be operated, correspondingly to the D/A converter 103, with either 8 kHz or 16 kHz sampling frequency.

When the codec decision unit 102 gives a decision that the IP network 70 has narrowband characteristics, the A/D converter 104 converts the analog voice signal from the filter unit 105 into the digital voice signal by the sampling frequency of 8 kHz. On the other hand, when the codec decision unit 102 gives a decision that the IP network 70 has broadband characteristics with G.722 codec, the above analog-to-digital conversion is executed by the sampling frequency of 16 kHz.

The voice encoder 107 is adapted to encode the digital voice signal from the A/D converter 104 into an IP packet and output the IP packet to the IP network 70.

As already described, in this embodiment, the transmitter band-pass filter unit 105 is adapted to band-limit the analog voice signal. However, the transmitter band-pass filter unit 105 may be adapted to band-limit a digital voice signal in the digital signal processing.

(A-2) Operation of the First Embodiment

The operation of the first embodiment of the invention, the voice communication apparatus 10, will be described. It should be noted that the switches 10A and 10B initially select their terminals 10A1 and 10B1 respectively, until the communication switching unit 101 detects a voice signal input from the PSTN 60.

Now, voice communications will commence between the voice communication apparatus 10 and a counterpart communication terminal, not shown, over the IP network 70. When an IP packet is received from the IP network 70, the codec decision unit 102 obtains the type of codec used for voice communications with the counterpart communication terminal. The codec type information can be obtained from the results of negotiation with the counterpart communication terminal when starting the communication, or from the RTP header of the IP packet received.

The codec decision unit 102 then decides, based on the type of codec obtained, whether the IP network 70 has broadband or narrowband characteristics. The codec decision unit 102 informs both the D/A converter 103 and the A/D converter 104 of the result from the above decision.

The IP packet from the IP network 70 is passed to the voice decoder 106. The voice decoder 106 then disassembles the IP packet to form a digital voice signal. The thus formed digital voice signal is passed to the D/A converter 103 and in turn converted to an analog voice signal. The converted analog voice signal is transmitted to the earphone 112 of the telephone set 11.

The above-mentioned digital-to-analog conversion is executed, in accordance with a decision from the codec decision unit 102, with the sampling frequency of 8 kHz or 16 kHz appropriate for the frequency characteristics of the IP network 70.

As opposed to the voice signal input from the IP network 70, the voice emitted by the user is picked up by the microphone 111 of the telephone set 11, converted into an analog voice signal, and then passed to the transmitter band-pass filter unit 105. The analog voice signal is band-limited by the band-pass filter unit 105 into a narrowband voice signal.

As already described, the switch 10B is operated by the communication switching unit 101 to initially select the terminal 10B1 so that the narrowband voice signal from the transmitter band-pass filter unit 105 is passed to the A/D converter 104 and thereby converted into a digital voice signal.

The above-mentioned analog-to-digital conversion is executed, in accordance with the decision from the codec decision unit 102, with the sampling frequency of 8 kHz or 16 kHz appropriate for the frequency characteristics of the IP network 70.

The digital voice signal A/D-converted by the A/D converter 104 is passed to the voice encoder 107 so as to be encoded into an IP packet and then output to the IP network 70.

A description will now be made on a case, in which voice communications are made between the voice communication apparatus 10 and a counterpart communication terminal over the PSTN 60. When a voice signal input from the PSTN 60 is detected by the communication switching unit 101, the switches 10A and 10B are operated by the unit 101 to select the terminals 10A2 and 10B2 respectively. The voice signal from the PSTN is therefore passed via the switch 10A to the earphone 112 of the telephone set 11.

As opposed to the voice signal input from the PSTN 60, the voice emitted by the user is picked up by the microphone 111 of the telephone set 11, converted into an analog voice signal, and then passed to the transmitter band-pass filter unit 105. The analog voice signal is band-limited by the transmitter band-pass filter unit 105 into a narrowband voice signal. The narrowband voice signal is thus output via the switch 10B to the PSTN 60.

(A-3) Effect of the First Embodiment

In accordance with the above-described first embodiment, since a plurality of voice communication circuitry are selectable by the communication switching unit 101, the voice communications may be carried out appropriately for each voice communication network connected to the apparatus 10.

Moreover, in accordance with the first embodiment, since a voice signal is band-limited by the transmitter band-pass filter unit 105 and then output to the network 60 or 70, it is therefore possible to prevent a broadband voice signal from being output to the network transmitting only narrowband voice signals. Therefore a better voice transmission quality can be maintained.

(B) Second Embodiment

Referring to the drawings, a second embodiment of voice communication apparatus of the present invention will be described in detail.

(B-1) Structure and Operation of the Second Embodiment

Figure 3:
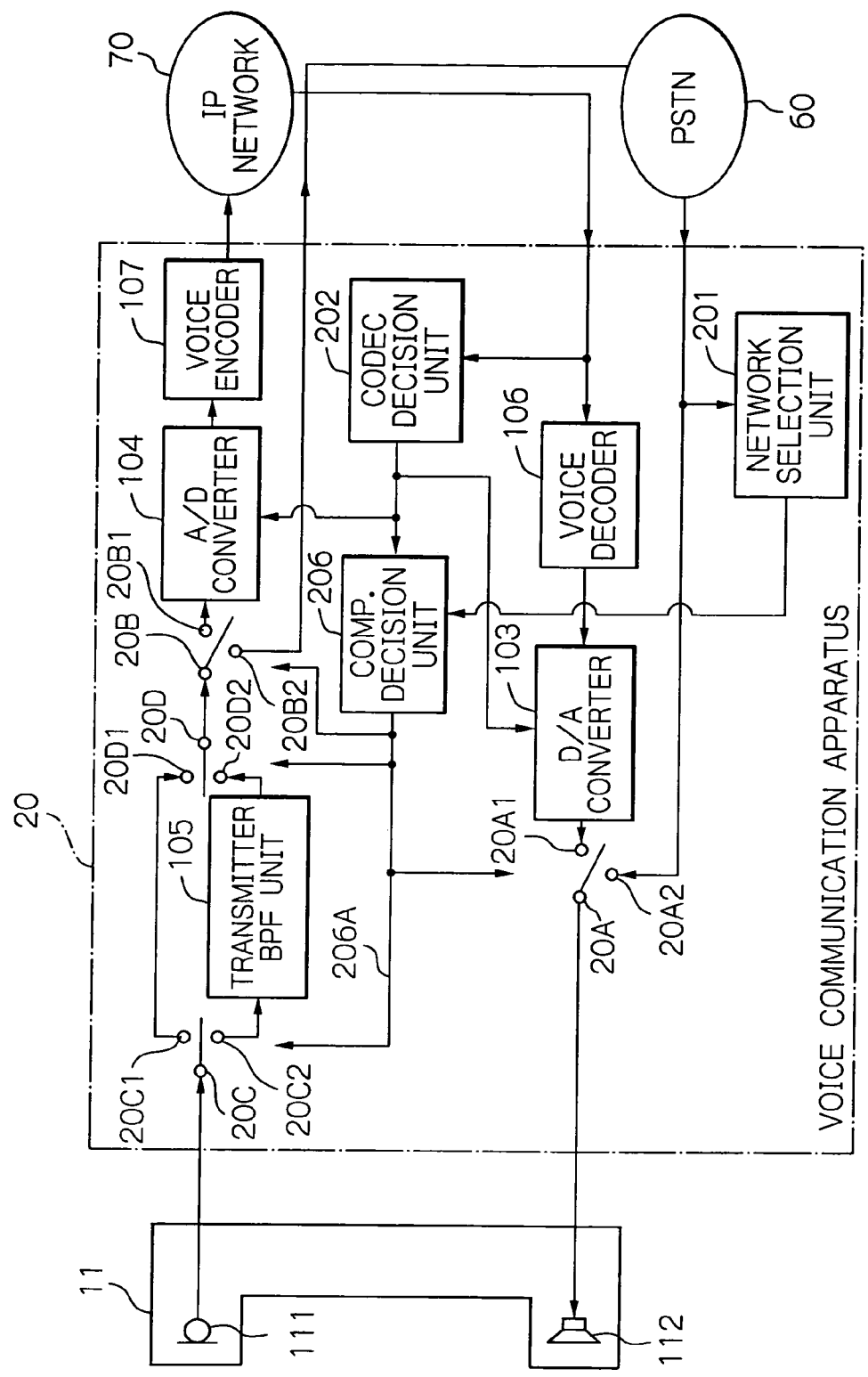
FIG. 3 is a schematic block diagram showing a second embodiment of a voice communication apparatus according to the present invention.

FIG. 3 is a schematic block diagram showing the second embodiment of voice communication apparatus according to the present invention.

As shown in FIG. 3, the voice communication apparatus 20 includes a network selection unit 201 in place of the communication switching unit 101, a codec decision unit 202, the D/A converter 103, the A/D converter 104, the transmitter band-pass filter unit 105, the voice decoder 106, the voice encoder 107, a comprehensive decision unit 206, and switches 20A, 20B, 20C and 20D interconnected as illustrated.

The voice communication apparatus 20 i.e. second embodiment of the present invention is the same as the voice communication apparatus 10 i.e. the first embodiment of the present invention except for the following points. The apparatus 20 includes the comprehensive decision unit 206. Besides, the function of the network selection unit 201 and of the codec decision unit 202 of the apparatus 20 is different from that of the corresponding elements 101 and 102 of the apparatus 10.

In the following, only the above points of the second embodiment different from the first embodiment will be described in detail. The description of the functions of the elements common to the first and second embodiments will be omitted. The structural elements common to both embodiments will be designated with the same reference numerals.

The network selection unit 201 is adapted to detect a voice signal input from the PSTN 60, to thereby select the PSTN 60 or the IP network 70, from which a voice signal is input, as with the unit 101 of the first embodiment. However, the unit 201 differs from the unit 101 on the point that the unit 201 sends the information of the selected network to the comprehensive decision unit 206.

The codec decision unit 202 is, as with the first embodiment, adapted to decide, based on the type of codec used for voice communications with a counterpart communication terminal, whether the IP network 70 has broadband or narrowband characteristics. The codec decision unit 202 gives the above decision not only to the D/A converter 103 and the A/D converter 104 but also to the comprehensive decision unit 206.

The comprehensive decision unit 206 is adapted to receive from the network selection unit 201 the selected network, the PSTN 60 or the IP network 70, and to receive from the codec decision unit 202 the decision on the frequency characteristics of the IP network 70. The comprehensive decision unit 206 is also adapted to operate the switches 20A, 20B, 20C and 20D for connecting the telephone set 11 either via the PSTN communication circuitry to the PSTN 60 or via the broadband communication circuitry to the IP network 70, taking account of the above-mentioned selected network and the frequency characteristics. The comprehensive decision unit 206 is further adapted to decide whether or not the voice signal transmitted from the telephone set 11 is conducted to the transmitter band-pass filter unit 105 before being output to the PSTN 60 or to the IP network 70.

The switches 20C and 20D are operated by the comprehensive decision unit 206 in order to or not to conduct the voice signal from the microphone 111 to the transmitter band-pass filter unit 105. When the switches 20C and 20D are operated to select terminals 20C1 and 20D1 respectively, the voice signal from the microphone 111 is passed directly to the switch 20B without being conducted to the transmitter band-pass filter unit 105. When the switches 20C and 20D are operated to select terminals 20C2 and 20D2 respectively, the voice signal from the microphone 111 is conducted to the transmitter band-pass filter unit 105.

The transmitter band-pass filter unit 105 includes a band-limiting filter attenuating an analog voice signal at low and high frequency components thereof, as shown in FIG. 2A.

FIG. 4 illustrates a table useful for understanding switch operation effected by the comprehensive decision unit 206. In FIG. 4, when the switch 20A is operated to select for example the terminal 20A2, which means that the transmission will be made on the narrowband on the PSTN 60, the status of the switch 20A is simply indicated by the number '2' in the column of the switch 20A.

When a voice signal input from the PSTN 60 is detected, the switches 20A, 20B, 20C and 20D are operated by the comprehensive decision unit 206 to select the terminals 20A2, 20B2, 20C2 and 20D2 respectively. Accordingly, the voice signal from the microphone 111 is band-limited and therefore output in the form of narrowband voice signal to the PSTN 60. So, it is possible to prevent the broadband voice signal from being output to the PSTN 60.

When a broadband voice signal is input from the IP network 70, the switches 20A, 20B, 20C and 20D are operated by the comprehensive decision unit 206 to select the terminals 20A1, 20B1, 20C1 and 20D1 respectively. In this case, if the telephone set 11 has broadband characteristics, the broadband voice signal from the telephone set 11 can be directly output to the IP network 70 without being subjected to bandwidth-limitation. Therefore, a better voice transmission quality can be maintained.

When a narrowband voice signal is input from the IP network 70, the switches 20A, 20B, 20C and 20D are operated by the comprehensive decision unit 206 to select the terminals 20A1, 20B1, 20C2 and 20D2 respectively. In this case, the voice signal from the microphone 111 is band-limited into a narrowband voice signal. The narrowband voice signal is then passed to the voice encoder 107 wherein the signal is encoded into a narrowband IP packet. In other words, it is possible to prevent a broadband voice signal from being passed to the voice encoder 107 to which the above-mentioned narrowband voice signal should exclusively be passed.

The comprehensive decision unit 206 operates as described above. The remaining operation of the second embodiment is the same as that of the first embodiment. However, the band-pass filter of the unit 105 may additionally includes the function of amplifying frequency components of a voice signal which have been attenuated along frequency characteristics of the telephone set 11.

(B-2) Effect of the Second Embodiment

The second embodiment of the present invention described above has the same effects as those of the first embodiment.

In addition, the second embodiment is provided with the comprehensive decision unit 206 for taking account of the selected network i.e. PSTN 60 or IP network 70 used for voice communications and selected by the network selection unit 201 and the frequency characteristics of the IP network 70 obtained from the codec decision unit 202. Therefore, when the selected network is the IP network 70 having broadband characteristics, the voice signal from the telephone set 11 of broadband type can be transmitted in the form of original broadband voice signal, without being band-limited, to a counterpart communication terminal. As a result, the counterpart communication terminal can receive a voice signal of high-quality.

(C) Third Embodiment

A third embodiment of the voice communication apparatus according to the present invention will be described in detail.

(C-1) Structure and Operation of the Third Embodiment

Figure 5A:
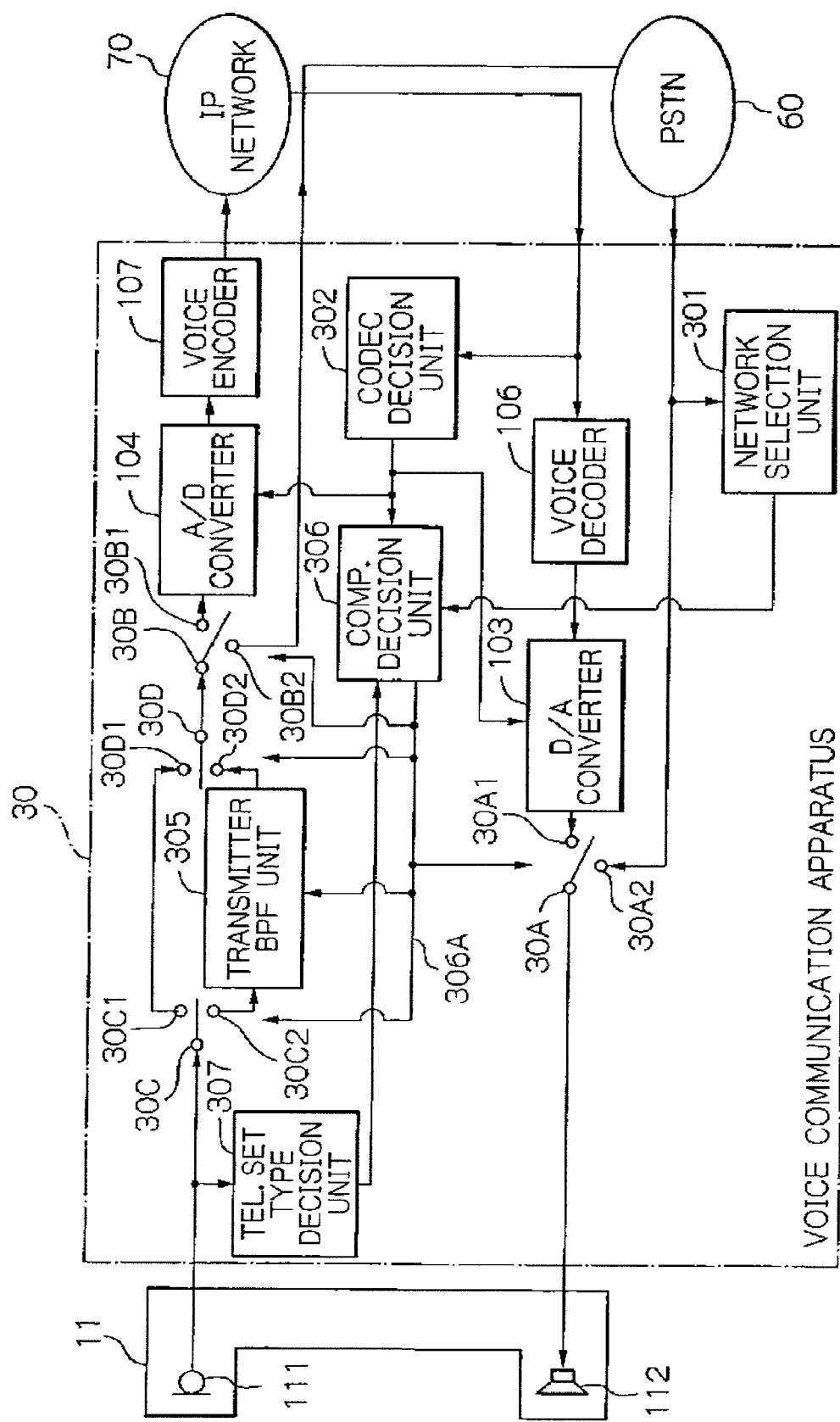
FIG. 5A is a schematic block diagram showing a third embodiment of a voice communication apparatus according to the present invention.

FIG. 5A is a schematic block diagram showing the third embodiment of voice communication apparatus according to the present invention.

As shown in FIG. 5A, the voice communication apparatus 30 includes a telephone set type decision unit 307 and structural elements corresponding to those of FIG. 3 interconnected as illustrated.

The voice communication apparatus 30 i.e. third embodiment of the present invention is the same as the preceding voice communication apparatuses 10 and 20 i.e. the first and second embodiments of the present invention, respectively, except for the following points. The apparatus 30 includes the telephone set type decision unit 307. Besides, the function of the comprehensive decision unit 306 and the transmitter band-pass filter unit 305 of the apparatus 30 is different from that of the corresponding structural elements of the apparatus 20.

In the following, only the points of the third embodiment different from the first and second embodiments will be described in detail. The description of the functions of the structural elements common to the first, second and third embodiments will be omitted. The structural elements common to the three embodiments will be designated with the same reference numerals.

The telephone set type decision unit 307 is adapted to measure a frequency bandwidth provided by the telephone set 11 based on the parameters thereof to decide whether the telephone set 11 has frequency characteristics of broadband or narrowband. The unit 307 sends the information of the above-decided frequency characteristics to the comprehensive decision unit 306.

For example, if a voice signal from the microphone 111 of the telephone set 11 includes the frequency components distributed substantially in the range of 4 kHz or higher, the telephone set type decision unit 307 decides that the telephone set 11 has broadband characteristics. If no frequency component of the voice signal is distributed in the above-stated range, the telephone set type decision unit decides that the telephone set 11 has narrowband characteristics.

The telephone set type decision unit 307 can use any kind of method other than the above-mentioned one to decide the frequency characteristics of the telephone set 11.

Figure 5B:
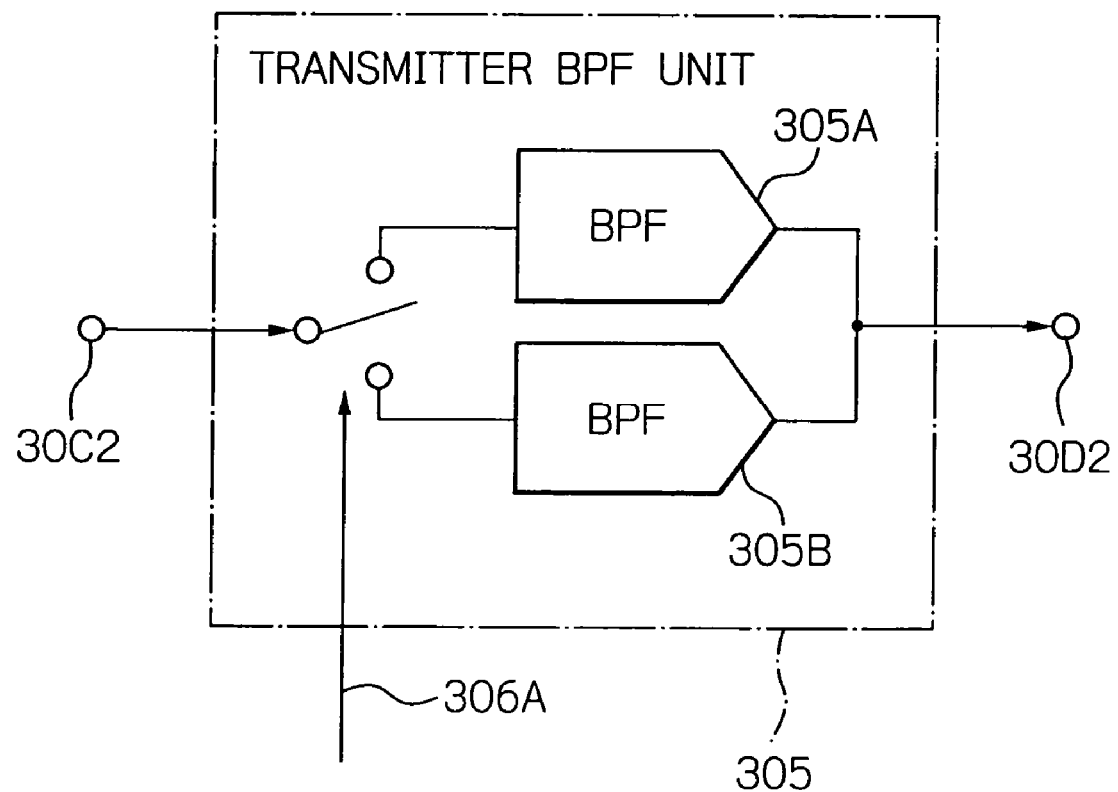
FIG. 5B is a schematic block diagram of the transmitter band-pass filter unit illustrated in FIG. 5A.

FIG. 5B is a schematic block diagram of the transmitter band-pass filter unit 305 illustrated in FIG. 5A. As shown in FIG.5B, the unit 305 generally includes band-pass filters (BPF) 305A and 305B. The unit 305 selects one of the two filters 305A and 305B in accordance with a command 306A from the comprehensive decision unit 306. The selected filter is used to filter an analog voice signal from the terminal 30C2 and to output the filtered voice signal to the terminal 30D2.

The one filter 305A has such frequency characteristics as shown in FIG. 2A, whereby a voice signal from the microphone 111 is band-limited to a narrowband voice signal. The filter 305A is effectively used in the communication between a network of narrowband characteristics and the telephone set 11 of broadband characteristics.

Figure 2B:
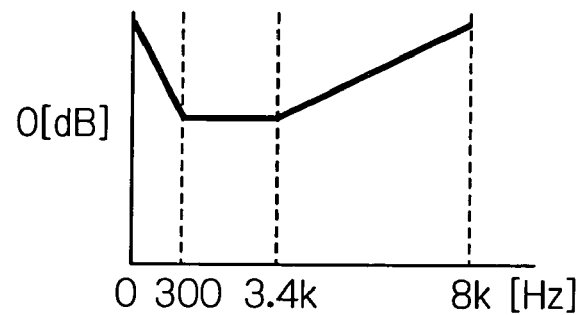

The other filter 305B has such frequency characteristics as shown in FIG. 2B, whereby low and high frequency components of a voice signal, which have been attenuated along narrowband characteristics of the telephone set 11, are amplified by a gain for obtaining a desirable broadband voice signal for better voice signal quality. The filter 305B is effectively used in the communication between a network of broadband characteristics and the telephone set 11 of narrowband characteristics.

In this embodiment, the transmitter band-pass filter unit 305 has the filters having the characteristics shown in FIGS. 2A and 2B. However, the filter unit 305 can have other filters of various frequency characteristics in place of the above two filters 305A and 305B. In FIG. 5A, the switches 30C and 30D conduct a voice signal to the filter unit 305 or make a voice signal bypass the unit 305.

The comprehensive decision unit 306 is adapted to receive the telephone set type i.e. frequency characteristics of the telephone set 11 from the telephone set type decision unit 307, in addition to the information obtained from the network selection unit 301 and the codec decision unit 302. The comprehensive decision unit 306 is also adapted, taking account of the above-mentioned information received, to issue a command 306A to set one of the filters 305A and 305B in the transmitter band-pass filter unit 305. The comprehensive decision unit 306 is further adapted to operate the switches 30A, 30B, 30C and 30D for connecting the telephone set 11 either via the PSTN communication circuitry to the PSTN 60 or via the broadband communication circuitry to the IP network 70.

Referring to FIG. 6, the operation of the comprehensive decision unit 306 will be described in the following. When a voice signal is input from the PSTN 60 and the telephone set 11 has broadband characteristics, the switches 30A, 30B, 30C and 30D are operated by the comprehensive decision unit 306 to select the terminals 30A2, 30B2, 30C2 and 30D2, respectively. In addition, in the transmitter band-pass filter unit 305, the band-limiting filter 305A of FIG. 2A is selected in accordance with a command 306A from the comprehensive decision unit 306. In this way, the voice signal from the telephone set 11 is filtered to be a narrowband voice signal so that no broadband voice signal is output to the PSTN 60.

When the voice signal is input from the PSTN 60 and the telephone set 11 has narrowband characteristics, the switches 30A, 30B, 30C and 30D are operated by the comprehensive decision unit 306 to select the terminals 30A2, 30B2, 30C1 and 30D1, respectively. In this way, the narrowband voice signal from the telephone set 11 is not conducted to the transmitter band-pass filter unit 305 but directly to the PSTN 60.

In the above case the transmitter band-pass filter unit 305 is bypassed. However, if the filter 305A of FIG. 2A is selected in the filter unit 305 and the switches 30C and 30D are operated to select the terminals 30C2 and 30D2 in the same case, the voice signal from the telephone set 11 can be filtered by the transmitter band-pass filter unit 305 before being output to the PSTN 60.

When broadband voice signal is input from the IP network 70 and the telephone set 11 has broadband characteristics, the switches 30A, 30B, 30C and 30D are operated by the comprehensive decision unit 306 to select the terminals 30A1, 30B1, 30C1 and 30D1, respectively. In this way, the broadband voice signal from the telephone set 11 is not conducted to the transmitter band-pass filter unit 305 but directly to the IP network 70.

Figure 2C:
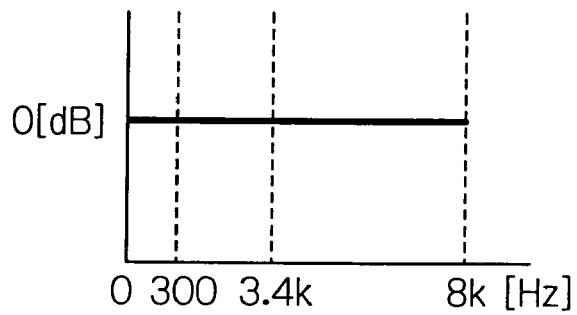

In the above case the transmitter band-pass filter unit 305 is bypassed. However, if the filter of FIG. 2C, whereby flat frequency characteristics are obtained all over the frequency range or at the range lower than 8 kHz, is prepared in the filter unit 305 and the switches 30C and 30D are operated to select the terminals 30C2 and 30D2 in the same case, the voice signal from the telephone set 11 can be filtered by the transmitter band-pass filter unit 305 to be a desirable broadband voice signal before being output to the IP network 70.

When the broadband voice signal is input from the IP network 70 and the telephone set 11 has narrowband characteristics, the switches 30A, 30B, 30C and 30D are operated by the comprehensive decision unit 306 to select the terminals 30A1, 30B1, 30C2 and 30D2, respectively. In addition, in the transmitter band-pass filter unit 305, the band-expanding filter 305B of FIG. 2B is selected in accordance with a command 306A from the comprehensive decision unit 306. In this way, a counterpart communication terminal can receive a broadband voice signal of better voice transmission quality, even if the telephone set 11 connected to the apparatus 30 is an ordinary one i.e. a narrowband type.

When a narrowband voice signal is input from the IP network 70 and the telephone set 11 has broadband characteristics, the switches 30A, 30B, 30C and 30D are operated by the comprehensive decision unit 306 to select the terminals 30A1, 30B1, 30C2 and 30D2, respectively. In addition, in the transmitter band-pass filter unit 305, the band-limiting filter 305A of FIG. 2A is selected in accordance with a command from the comprehensive decision unit 306. In this way, it is possible to prevent the broadband voice signal from being passed to the voice encoder 107 to which a narrowband voice signal should exclusively be passed.

When a narrowband voice signal is input from the IP network 70 and the telephone set 11 has narrowband characteristics, the switches 30A, 30B, 30C and 30D are operated by the comprehensive decision unit 306 to select the terminals 30A1, 30B1, 30C1 and 30D1, respectively. In this way, the narrowband voice signal from the telephone set 11 is not conducted to the transmitter band-pass filter unit 305 but directly to the IP network 70.

In the above case the transmitter band-pass filter unit 305 is bypassed. However, if the filter 305A of FIG. 2A is selected in the filter unit 305 and the switches 30C and 30D are operated to select the terminals 30C2 and 30D2 in the same case, the voice signal from the telephone set 11 can be filtered by the transmitter band-pass filter unit 305 to be a desirable narrowband voice signal before being output to the IP network 70.

(C-3) Effect of the Third Embodiment

The third embodiment of the present invention described above has the same effects as those of the first and second embodiments.

In addition, the third embodiment is provided with the telephone set type decision unit 307 for deciding the type of the telephone set 11 connected to the voice communication apparatus 30. Therefore, the comprehensive decision unit 306 can take account of frequency characteristics of the telephone set 11 in addition to frequency characteristics of the selected network, in order to select a desirable band-pass filter 305A or 305B in the transmitter band-pass filter unit 305.

As a result, in the phase of transmitting a voice signal from the telephone set, the counterpart communication terminal can receive a voice signal of better transmission quality.

(D) Fourth Embodiment

A fourth embodiment of the voice communication apparatus according to the present invention will be hereinafter described.

(D-1) Structure and Operation of the Fourth Embodiment

Figure 7:
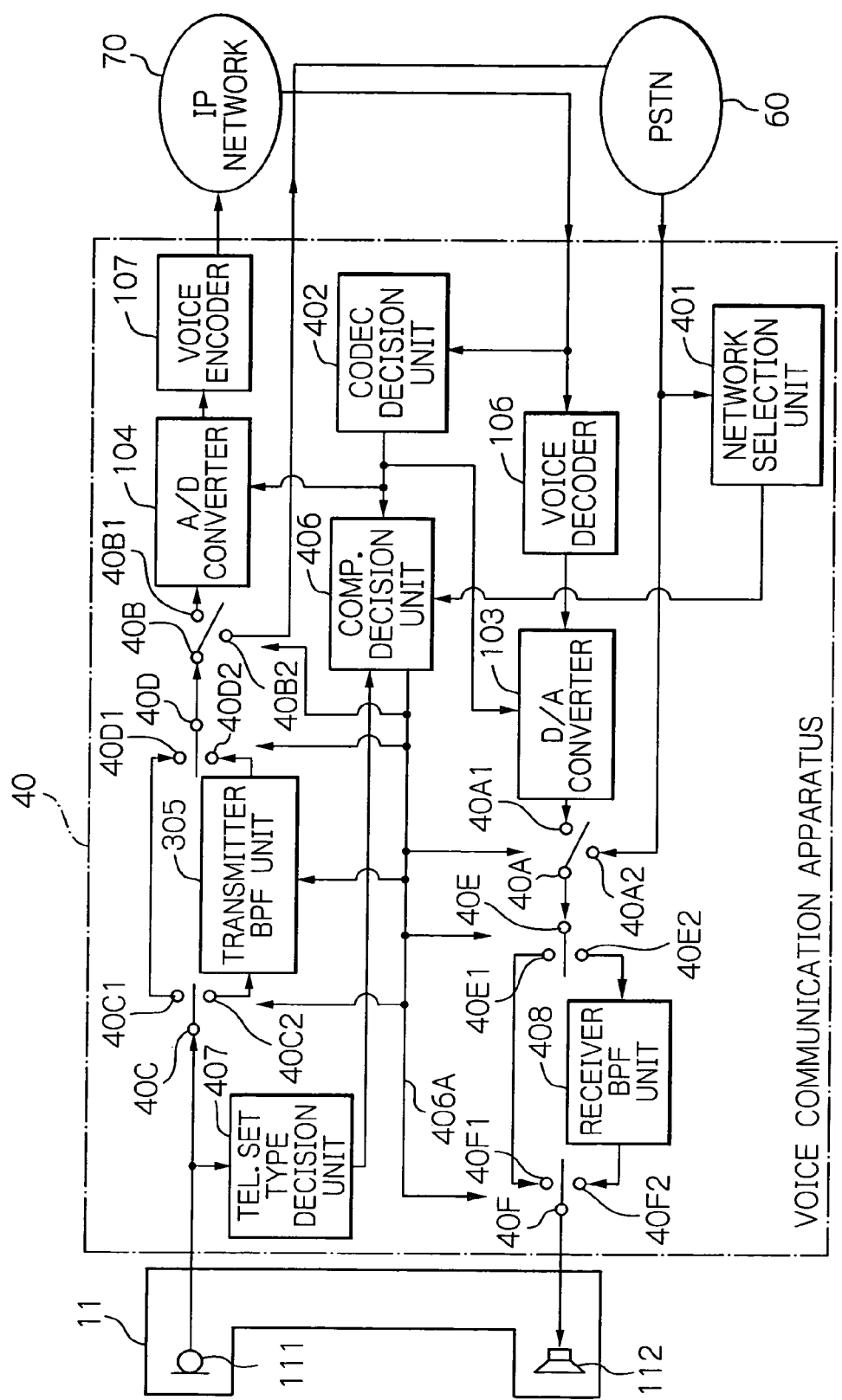
FIG. 7 is a schematic block diagram showing a fourth embodiment of a voice communication apparatus according to the present invention.

FIG. 7 is a schematic block diagram showing the fourth embodiment of voice communication apparatus according to the present invention. As shown in FIG. 7, the voice communication apparatus 40 includes a receiver band-pass filter unit 408 and switches 40E and 40F interconnected as illustrated, in addition to structural elements corresponding to those of FIG. 5.

The voice communication apparatus 40 i.e. fourth embodiment of the present invention is the same as the third embodiment of the present invention except for the following points. The apparatus 40 includes the receiver band-pass filter unit 408. Besides, the comprehensive decision unit 406 operates the switches 40E and 40F for selecting or bypassing the receiver band-pass filter unit 408.

In the following, only the above points of the fourth embodiment different from the third embodiment will be described in detail. The description of the functions of the elements common to the third and fourth embodiments will be omitted. The elements common to the two embodiments will be indicated with the same reference numerals.

The receiver band-pass filter unit 408 is adapted to adjust frequency characteristics of a voice signal input from the PSTN 60 or from IP network 70, in a call connection of the IP network 70 having broadband characteristics and the telephone set 11 of narrowband characteristics. The unit 408 includes a band-pass filter, not shown. The band-pass filter has such frequency characteristics as shown in FIG. 2B, whereby low and high frequency components of a voice signal are amplified by a gain for obtaining a desirable broadband voice signal for better voice signal quality.

The function of the comprehensive decision unit 406 is generally the same as that of the unit 306 of FIG. 5A. However, the unit 406 is also adapted to operate the switches 40E and 40F to decide whether or not the voice signal input is conducted to the receiver band-pass filter unit 408 before being received by the telephone set 11.

Referring to FIG. 8, the operation of the comprehensive decision unit 406 will be described in the following. The operation of the comprehensive decision unit 406 is generally the same as that of the unit 306 of FIG. 5A. The switches 40E and 40F are almost always operated to select the terminals 40E1 and 40F1 respectively, to bypass the receiver band-pass filter unit 408.

However, the unit 406 conducts a voice signal to the receiver band-pass filter unit 408 only when a broadband voice signal is input from the IP network 70 and the telephone set 11 has narrowband characteristics. In this case, the switches 40A, 40B, 40C, 40D, 40E and 40F are operated in accordance with a command 406A from the comprehensive decision unit 406 to select the terminals 40A1, 40B1, 40C2, 40D2, 40E2 and 40F2, respectively.

In this way, the telephone set 11 can receive a broadband voice signal of better voice transmission quality, even if the telephone set 11 connected to the apparatus 40 is an ordinary one having narrowband characteristics.

(D-2) Effect of the Fourth Embodiment

The fourth embodiment of the present invention described above has the same effects as those of the first, second and third embodiments. That is, better voice signal quality is achieved in the phase of transmitting a voice signal from the telephone set.

In addition, the fourth embodiment includes the receiver band-pass filter unit 408, so that it achieves better voice signal quality even in the phase of receiving a voice signal from a network of broadband by a telephone set of narrowband characteristics.

(E) Fifth Embodiment

A fifth embodiment of the voice communication apparatus according to the present invention will be hereinafter described.

(E-1) Structure and Operation of Fifth Embodiment

Figure 9A:
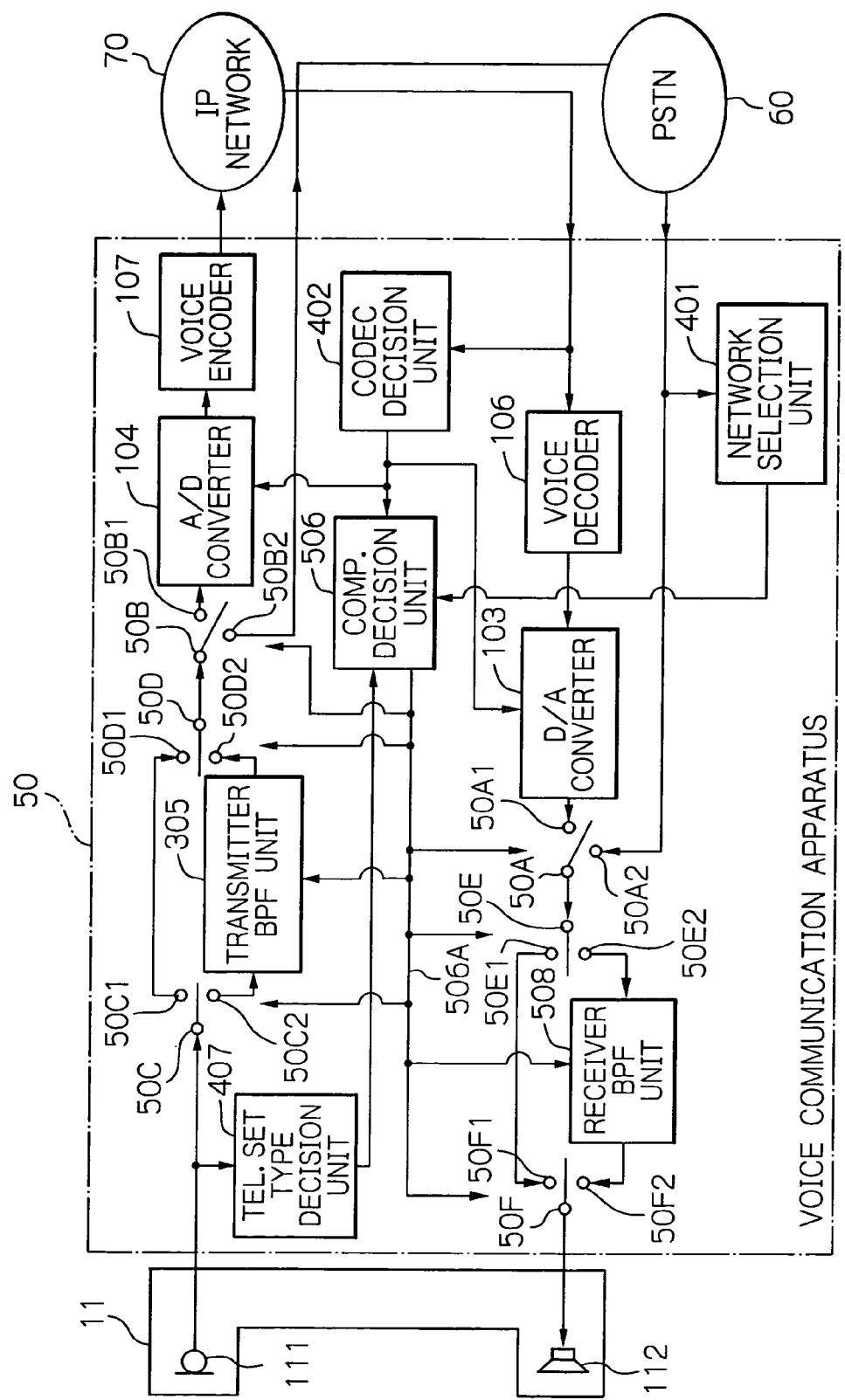
FIG. 9A is a schematic block diagram showing a fifth embodiment of a voice communication apparatus according to the present invention.

FIG. 9A is a schematic block diagram showing the fifth embodiment of voice communication apparatus according to the present invention. As shown in FIG. 9A, the voice communication apparatus 50 includes elements corresponding to those of FIG. 7. However, the structure of the receiver band-pass filter unit 508 and the function of the comprehensive decision unit 506 are different from those of FIG. 7.

FIG. 9B is a schematic block diagram of the receiver band-pass filter unit 508 illustrated in FIG. 9A. The structure of the unit 508 is like that of the transmitter band-pass unit 305 shown in FIG. 5B. The unit 508 generally includes band-pass filters 508B and 508D. The unit 508 is adapted to select one of the two filters 508B and 508D in accordance with a command 506A from the comprehensive decision unit 506. The selected filter is used to filter an analog voice signal from the terminal 50E2 and to output the filtered voice signal to the terminal 50F2.

The one filter 508B is effectively used in the communication between a network of broadband characteristics and the telephone set 11 of narrowband characteristics. The filter 508B has such frequency characteristics as shown in FIG. 2B. The filter 508B therefore amplifies frequency components of a voice signal which will be attenuated along narrowband characteristics of the telephone set.

Figure 2D:
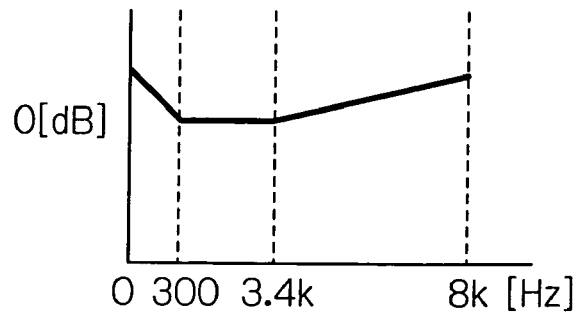

The other filter 508D is effectively used in the communication between a network of narrowband characteristics and the telephone set 11 of broadband characteristics. The filter 508D has such frequency characteristics as shown in FIG. 2D. The filter 508D therefore amplifies frequency components of a voice signal which have been attenuated along the narrowband characteristics of the network. For example, attenuated frequency components of a voice signal distributed outside a frequency range from 300 Hz to 3.4 kHz is amplified by a gain for obtaining a desirable broadband voice signal for better voice transmission quality.

In this embodiment, the receiver band-pass filter unit 508 includes filters having the characteristics shown in FIGS. 2B and 2D. However, the filter unit 508 can have other filters of various frequency characteristics in place of the above two filters 508B and 508D. In FIG. 9A, the switches 50E and 5OF conduct a voice signal to the filter unit 508 or make a voice signal bypass the unit 508.

The comprehensive decision unit 506 is adapted to receive information from the network selection unit 401, the codec decision unit 402 and the telephone set type decision unit 407. The comprehensive decision unit 506 is also adapted to operate the switches 50A, 50B, 50C, 50D, 50E and 50F, taking account of the above-mentioned information received. The comprehensive decision unit 506 also issues a command 506A to select one of the filters 508B and 508D in the transmitter band-pass filter unit 305 and the receiver band-pass filter unit 508.

Referring to FIG. 10, the operation of the comprehensive decision unit 506 will be described in the following. The operation of the comprehensive decision unit 506 is generally the same as that of the unit 406 of FIG. 7. However, when the telephone set 11 and the selected network have different frequency characteristics from each other, the switches 50E and 50F are operated to select the terminals 50E2 and 50F2 respectively, to conduct a voice signal to the receiver band-pass filter unit 508.

More specifically, when the telephone set 11 has the narrowband characteristics and the selected network is the IP network 70 having the broadband characteristics, the comprehensive decision unit 506 issues a command 506A to set the band-pass filter 508B of FIG. 2B in the receiver band-pass filter unit 508. When the telephone set 11 has the broadband characteristics and the selected network is the public switched telephone network 60 or the IP network 70 having the narrowband characteristics, the unit 506 in turn issues a command 506A to set the band-pass filter 508D of FIG. 2D in the receiver band-pass filter unit 508.

(E) Effect of the Fifth Embodiment

The fifth embodiment of the present invention described above has the same effects as those of the first through fourth embodiments.

In addition, the receiver band-pass filter unit 508 of the fifth embodiment is provided with several filters for adjusting receiver frequency characteristics of a voice signal input from the PSTN 60 or from IP network 70. Therefore, in the phase of receiving, the telephone set 11 can receive a voice signal of better quality when the telephone set 11 and the selected network 60 or 70 have different frequency characteristics from each other.

(F) Other Embodiments (F-1) The voice communication apparatus according to the invention, exemplified by the above first to fifth embodiments, is particularly advantageous for use in applications in which a plurality of telephone sets are interconnected to the apparatus to establish various types of voice communications available, or in which a plurality of telephone sets of specific frequency characteristics are interconnected to the apparatus to communicate with counterpart communication terminals of various frequency characteristics.

The voice communication apparatus according to the invention may be integrated within a telephone set as one unit. In this case, there is no need to adapt the apparatus to a variety of telephone sets and therefore the telephone set type decision unit is not necessary. It enables the size of the apparatus to be smaller.

(F-2) The switch operations by the comprehensive decision units in the above-described second to fifth embodiments are no more than examples. More specifically, as far as the voice communications can be improved in transmission quality by taking account of characteristics of a network and of a telephone set, the switch operation of the comprehensive decision unit may be optionally changed by adjusting the frequency characteristics and/or number of the filters of the transmitter band-pass filter unit or the receiver band-pass filter unit.

The transmitter band-pass filter units, the telephone set type decision units and the receiver band-pass filter units in the above-described first to fifth embodiments are all implemented by analog signal processors. However, they can also be implemented by digital signal processors.

The entire disclosure of Japanese patent application No. 2003-99942 filed on Apr. 3, 2003, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

The invention claimed is:

1. A voice communication apparatus interposed between a telephone set and a public switched telephone network (PSTN) or a broadband network which can provide a frequency bandwidth broader than a frequency bandwidth of the public switched telephone network, comprising:
PSTN communication circuitry for transferring a voice signal between the telephone set and the public switched telephone network;
broadband communication circuitry for transferring a voice signal between the telephone set and the broadband network;
a communication switching unit for connecting the telephone set via said PSTN communication circuitry to the public switched telephone network when a voice signal is input from the public switched telephone network, and for connecting the telephone set via said broadband communication circuitry to the broadband network when a voice signal is input from the broadband network; and
a codec decision unit for deciding an encoding scheme available from an encoded voice signal input from the broadband network,
said broadband communication circuitry including:
a digital-to-analog (D/A) converter having a variable sampling frequency set to a sampling frequency defined in the encoding scheme decided by said codec decision unit and D/A-converting the encoded voice signal; and
an analog-to-digital (A/D) converter having a variable sampling frequency set to a sampling frequency defined in the encoding scheme decided by said codec decision unit and A/D-converting a voice signal transmitted from the telephone set.

2. The voice communication apparatus in accordance with claim 1, further comprising a transmitter band-pass filter unit including a band-pass filter for band-limiting by said band-pass filter a voice signal transmitted from the telephone set.

3. A voice communication apparatus interposed between a telephone set and a public switched telephone network (PSTN) or a broadband network which can provide a frequency bandwidth broader than a frequency bandwidth of the public switched telephone network, comprising:
PSTN communication circuitry for transferring a voice signal between the telephone set and the public switched telephone network;
broadband communication circuitry for transferring a voice signal between the telephone set and the broadband network;
a network selection unit for selecting the public switched telephone network or the broadband network, from which a voice signal is input;
a codec decision unit for measuring a frequency bandwidth provided by the broadband network to decide whether frequency characteristics of the broadband network are of broadband or narrowband; and
a comprehensive decision unit for taking account of the selected network and the frequency characteristics of the broadband network obtained respectively from said network selection unit and said codec decision unit, and connecting the telephone set either via said PSTN communication circuitry to the public switched telephone network or via said broadband communication circuitry to the broadband network.

4. The voice communication apparatus in accordance with claim 3, wherein said codec decision unit further decides an encoding scheme available from an encoded voice signal input from the broadband network,
said broadband communication circuitry comprising:
a digital-to-analog (D/A) converter having a variable sampling frequency set to a sampling frequency defined in the encoding scheme decided by said codec decision unit and D/A-converting the encoded voice signal; and
an analog-to-digital (A/D) converter having a variable sampling frequency set to a sampling frequency defined in the encoding scheme decided by said codec decision unit and A/D-converting a voice signal transmitted from the telephone set.

5. The voice communication apparatus in accordance with claim 3, further comprising a transmitter band-pass filter unit including a band-pass filter for filtering by said band-pass filter a voice signal transmitted from the telephone set, and thereby adjusting frequency characteristics of the voice signal;
said comprehensive decision unit deciding whether or not the voice signal transmitted from the telephone set is conducted to said transmitter band-pass filter unit before being output to the public switched telephone network or to the broadband network.

6. The voice communication apparatus in accordance with claim 5, wherein said band-pass filter is a filter for band-limiting a voice signal.

7. The voice communication apparatus in accordance with claim 5 wherein said band-pass filter amplifies frequency components of a voice signal which have been attenuated along frequency characteristics of the telephone set.

8. The voice communication apparatus in accordance with claim 5, wherein the telephone set has frequency characteristics of narrowband or broadband,
said apparatus further comprising a telephone set type decision unit for measuring a frequency bandwidth provided by the telephone set to decide whether the telephone set has frequency characteristics of broadband or narrowband,
said transmitter band-pass filter unit including a first band-pass filter for band-limiting a voice signal and a second band-pass filter for amplifying frequency components of a voice signal which have been attenuated along narrowband characteristics of the telephone set,
said comprehensive decision unit further taking account of the frequency characteristics of the telephone set obtained from said telephone set type decision unit, setting said first band-pass filter when the telephone set has the broadband characteristics and the selected network is the public switched telephone network or the broadband network having the narrowband characteristics, and setting said second band-pass filter when the telephone set has the narrowband characteristics and the selected network is the broadband network having the broadband characteristics.

9. The voice communication apparatus in accordance with claim 8, further comprising a receiver band-pass filter unit including a band-pass filter for filtering by said band-pass filter a voice signal input from the public switched telephone network or from the broadband network, and thereby adjusting frequency characteristics of the voice signal,
said comprehensive decision unit further deciding whether or not the voice signal input is conducted to said receiver band-pass filter unit before being received by the telephone set.

10. The voice communication apparatus in accordance with claim 9, wherein said band-pass filter amplifies frequency components of a voice signal which will be attenuated along narrowband characteristics of the telephone set.

11. The voice communication apparatus in accordance with claim 9, wherein said band-pass filter amplifies frequency components of a voice signal which have been attenuated along narrowband characteristics of the public switched telephone network or of the broadband network.

12. The voice communication apparatus in accordance with claim 9, said receiver band-pass filter unit including:

a first band-pass filter for amplifying frequency components of a voice signal which will be attenuated along narrowband characteristics of the telephone set; and
a second band-pass filter for amplifying frequency components of a voice signal which have been attenuated along narrowband characteristics of the public switched telephone network or of the broadband network,
said comprehensive decision unit setting said first band-pass filter when the telephone set has the narrowband characteristics and the selected network is the broadband network having the broadband characteristics, and setting said second band-pass filter when the telephone set has the broadband characteristics and the selected network is the public switched telephone network or the broadband network having the narrowband characteristics.

13. The voice communication apparatus in accordance with claim 3, further comprising a receiver band-pass filter unit including a band-pass filter for filtering by said band-pass filter a voice signal input from the public switched telephone network or from the broadband network, and thereby adjusting frequency characteristics of the voice signal,
said comprehensive decision unit deciding whether or not the voice signal input is conducted to said receiver band-pass filter unit before being received by the telephone set.

14. The voice communication apparatus in accordance with claim 13, wherein said band-pass filter amplifies frequency components of a voice signal which will be attenuated along narrowband characteristics of the telephone set.

15. The voice communication apparatus in accordance with claim 13, wherein said band-pass filter amplifies frequency components of a voice signal which have been attenuated along narrowband characteristics of the public switched telephone network or of the broadband network.

16. The voice communication apparatus in accordance with claim 13, wherein the telephone set has frequency characteristics of narrowband or broadband,
said apparatus further comprising a telephone set type decision unit for measuring a frequency bandwidth provided by the telephone set to decide whether the telephone set has frequency characteristics of broadband or narrowband,
said receiver band-pass filter unit including:
a first band-pass filter for amplifying frequency components of a voice signal which will be attenuated along narrowband characteristics of the telephone set; and
a second band-pass filter for amplifying frequency components of a voice signal which have been attenuated along narrowband characteristics of the public switched telephone network or of the broadband network,
said comprehensive decision unit further taking account of the frequency characteristics of the telephone set obtained from said telephone set type decision unit, setting said first band-pass filter when the telephone set has the narrowband characteristics and the selected network is the broadband network having the broadband characteristics, and setting said second band-pass filter when the telephone set has the broadband characteristics and the selected network is the public switched telephone network or the broadband network having the narrowband characteristics.

* * * * *

UNITED STATES PATENT AND TRADEMARK OFFICE
CERTIFICATE OF CORRECTION

| | | |
|---|---|---|
| PATENT NO. | : 7,848,495 B2 | Page 1 of 1 |
| APPLICATION NO. | : 11/239383 | |
| DATED | : December 7, 2010 | |
| INVENTOR(S) | : Kazuyoshi Akie et al. | |

It is certified that error appears in the above-identified patent and that said Letters Patent is hereby corrected as shown below:

Title Page, Item 65 (Prior Publication Data)

Please add the following to the prior publication data to read as follows:

--PCT/2004/004642 March 31, 2004--

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

PATENT NO. : 7,848,495 B2  Page 1 of 1
APPLICATION NO. : 11/239383
DATED : December 7, 2010
INVENTOR(S) : Kazuyoshi Akie et al.

It is certified that error appears in the above-identified patent and that said Letters Patent is hereby corrected as shown below:

Title Page, Item 63

Please add the following:

--Continuation of PCT/2004/004642 filed on March 31, 2004--

Signed and Sealed this
Sixteenth Day of August, 2011

David J. Kappos
*Director of the United States Patent and Trademark Office*